(12) United States Patent
Birk et al.

(10) Patent No.: US 7,869,015 B2
(45) Date of Patent: Jan. 11, 2011

(54) SELECTION OF A SIGNAL INPUT FROM AN OPTICAL FIBER MEMBER

(75) Inventors: Martin Birk, Belford, NJ (US); Philip H. Gerard, Conyers, GA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 12/060,303

(22) Filed: Apr. 1, 2008

(65) Prior Publication Data

US 2008/0187311 A1 Aug. 7, 2008

Related U.S. Application Data

(63) Continuation of application No. 11/274,444, filed on Nov. 15, 2005, now Pat. No. 7,372,554.

(51) Int. Cl.
*G01N 21/00* (2006.01)
(52) U.S. Cl. .................................... 356/73.1
(58) Field of Classification Search ............... 356/73.1; 250/227.11–227.17; 375/316, 329–331
See application file for complete search history.

(56) References Cited

U.S. PATENT DOCUMENTS

| | | | |
|---|---|---|---|
| 4,766,588 A | 8/1988 | Falk | |
| 4,893,002 A | 1/1990 | Kollanyi | |
| 5,258,615 A | 11/1993 | Thorley | |
| 5,329,393 A | 7/1994 | Huang | |
| 5,592,321 A | 1/1997 | Elbertbaum | |
| 5,926,298 A | 7/1999 | Li | |
| 6,185,345 B1 | 2/2001 | Singh et al. | |
| 6,449,074 B1 * | 9/2002 | Okano et al. ................. 398/91 |
| 6,665,466 B2 | 12/2003 | Katayama | |
| 6,798,952 B2 | 9/2004 | Naruse | |
| 6,807,371 B1 | 10/2004 | Abakoumov et al. | |
| 6,829,096 B1 | 12/2004 | Wade | |
| 6,922,530 B1 | 7/2005 | Kauffeldt et al. | |
| 7,158,584 B2 | 1/2007 | Agazzi | |

\* cited by examiner

*Primary Examiner*—Tu T Nguyen

(57) ABSTRACT

Methods and systems for analyzing optical parameters of a selected optical fiber member are disclosed. A signal input from an optical fiber member may be selected by instructing a corresponding optical separation device. The output from the corresponding optical separation device may be combined with the outputs of other optical separation devices using an optical coupler. A measurement circuit may measure the optical parameter from the output. Proper operation of an optical separation device may be validated by a monitoring circuit. The monitoring circuit may provide an indication to a user or may be processed by a diagnostic processor. A processing circuit may select one of the optical separation devices in order to measure the optical parameter for a corresponding optical fiber member and consequently may instruct an adjustment circuit to cause the selected optical fiber member to conform to a desired value of the optical parameter.

18 Claims, 6 Drawing Sheets

SELECTION OF A SIGNAL INPUT FROM AN OPTICAL FIBER MEMBER

This application is a continuation application of U.S. application Ser. No. 11/274,444, filed Nov. 15, 2005, the contents of which are incorporated by reference in their entirety.

FIELD OF TECHNOLOGY

The present disclosure relates to selecting signal inputs from a plurality of optical fibers.

BACKGROUND

Optical fiber communications systems support much of the total transmission capacity. Optical fiber communications provide a cost effective approach to transmitting numerous signals that may require large data rates and low latency times. However, an optical fiber communication system typically incorporates many individual optical fiber members, each optical fiber member requiring periodic testing to validate the integrity of each optical fiber member.

FIG. 1 shows an apparatus 100 for measuring an optical parameter for one of the fiber members in accordance with prior art. Processing unit 105 processes optical signal inputs 107, 109, and, 111 by instructing an optical N:1 switch 101 (e.g., an N:1 opto-mechanical switch) through an input selection port 113. The output of optical N:1 switch 101 approximately equals the selected signal input that is associated with one of the optical fiber members. Common measurement circuit 103 measures the output of optical N:1 switch 101 to determine a measured value of an optical parameter. Common measurement circuit 103 may measure one of a number of optical parameters, including an optical spectrum tilt (typically measured by an optical spectrum analyzer (OSA)), insertion loss, and a reflection coefficient (often measured by a reflectometer). Typically, it is not economically justifiable to dedicate a measurement circuit for each optical fiber member, and thus common measurement circuit 103 is shared among the optical fiber members.

Processing unit 105 obtains a measurement from common measurement circuit 103 and processes the measurement to provide a processing output 115. Processing unit 105 may further process the measurements with other obtained measurements to determine a measurement statistic (e.g., a measurement average and a measurement variability). Processing 105 typically repeats the measurement process for each optical fiber member.

Apparatus 100 may experience a hardware fault in which optical N:1 switch 101 gets "stuck" in one of the switching positions. With an opto-mechanical switch, the probability of a failure is typically correlated to the number of times that the opto-mechanical switch has switched. With such a failure mode, the output of optical N:1 switch 101 corresponds only to one of the signal inputs 107, 109, and 111 regardless of input selection 113. Processing circuit 105 may erroneously perceive that all optical fiber members are functioning properly based on the signal input that optical N:1 switch 101 is stuck at. Processing circuit 105 is typically not cognizant whether optical N:1 switch 101 is improperly functioning.

Thus, there is a need to provide apparatuses and methods for switching optical signals so that the functionality of a plurality of optical fiber members can be analyzed in a reliable manner.

BRIEF SUMMARY

The present disclosure provides methods and apparatuses for analyzing an optical parameter of a selected optical fiber member. A signal input from an optical fiber member may be selected by instructing a corresponding optical separation device, which has only one optical input and one optical output. Examples of an optical separation device include a 1:1 opto-mechanical switch and an electronic variable optical attenuator (EVOA). The output from the selected optical separation device may be combined with the outputs of the other optical separation devices using an optical coupler. A common measurement circuit may measure the optical parameter for the output of the selected optical separation device.

In accordance with at least one aspect of the disclosure, the proper operation of an optical separation device may be validated by a monitoring circuit. The monitoring circuit may provide an indication to a user or may be further processed by a diagnostic processor.

In accordance with another aspect of the disclosure, a processing circuit may select one of the optical separation devices in order to measure an optical parameter for a corresponding optical fiber member. Consequently, the processing circuit may instruct an adjustment circuit to cause the selected optical fiber member to conform to a desired value of the optical parameter.

In accordance with another aspect of the disclosure, a processing circuit may select one of the optical separation devices by providing an identification address on a measurement bus. The selected optical separation device consequently may provide a digital signal that corresponds to the signal input from the corresponding optical fiber member.

BRIEF DESCRIPTION OF THE DRAWINGS

A more complete understanding of the present disclosure and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which aspects of the disclosure may be practiced. It is to be understood that other embodiments may be utilized and structural and functional modifications may be made without departing from the scope of the present disclosure.

Definition for the following term is included to facilitate an understanding of the detailed description.

Optical separation device—A device that has one optical input and one optical output and is capable of adjusting the gain from the optical input to the optical output from approximately unity to approximately zero. Examples of a separation device include a 1:1 opto-mechanical switch and an electronic variable optical attenuator (EVOA).

Figure 1:
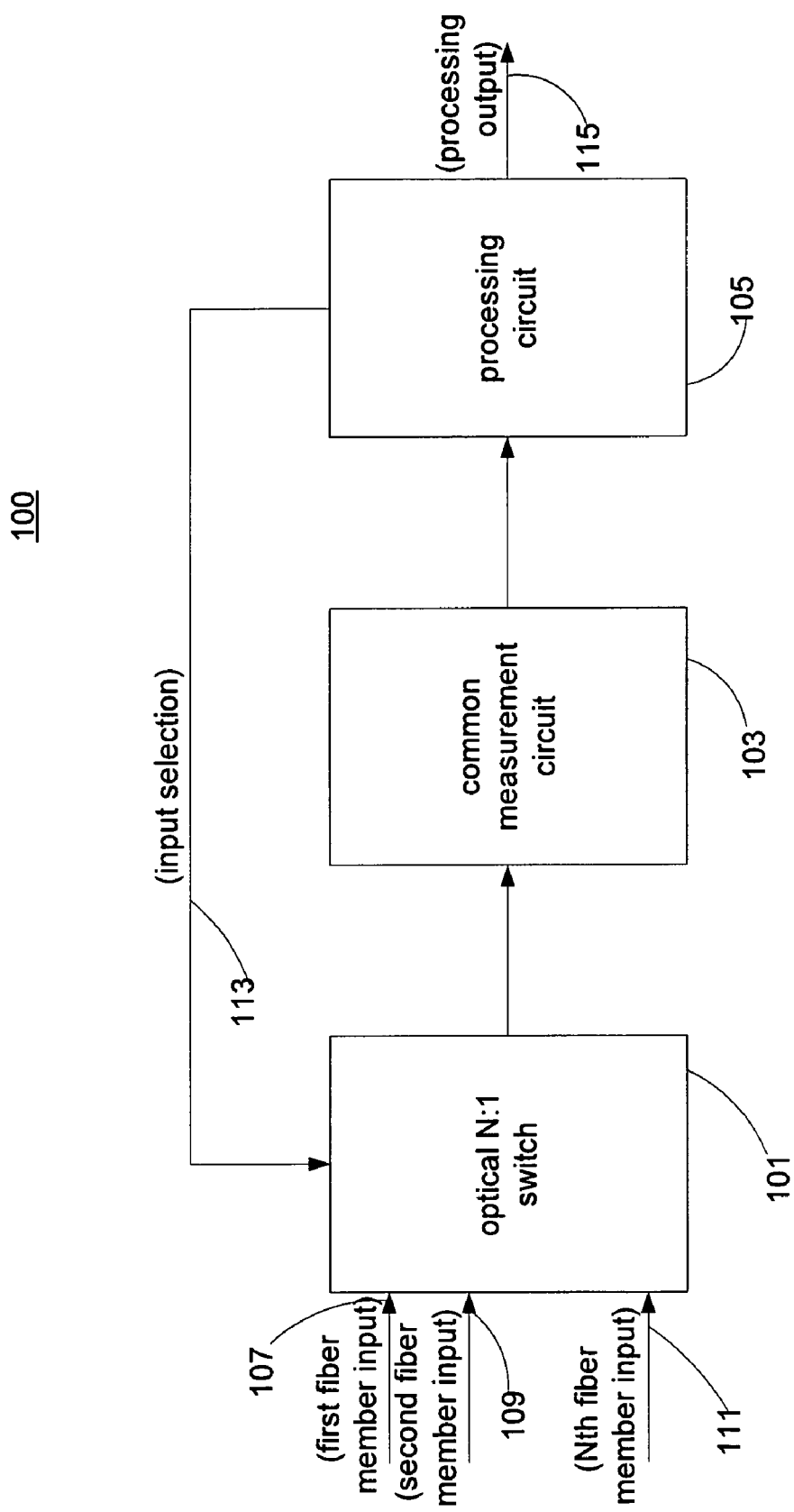
FIG. 1 shows an apparatus for measuring an optical parameter for one of the fiber members in accordance with prior art.
Figure 2:
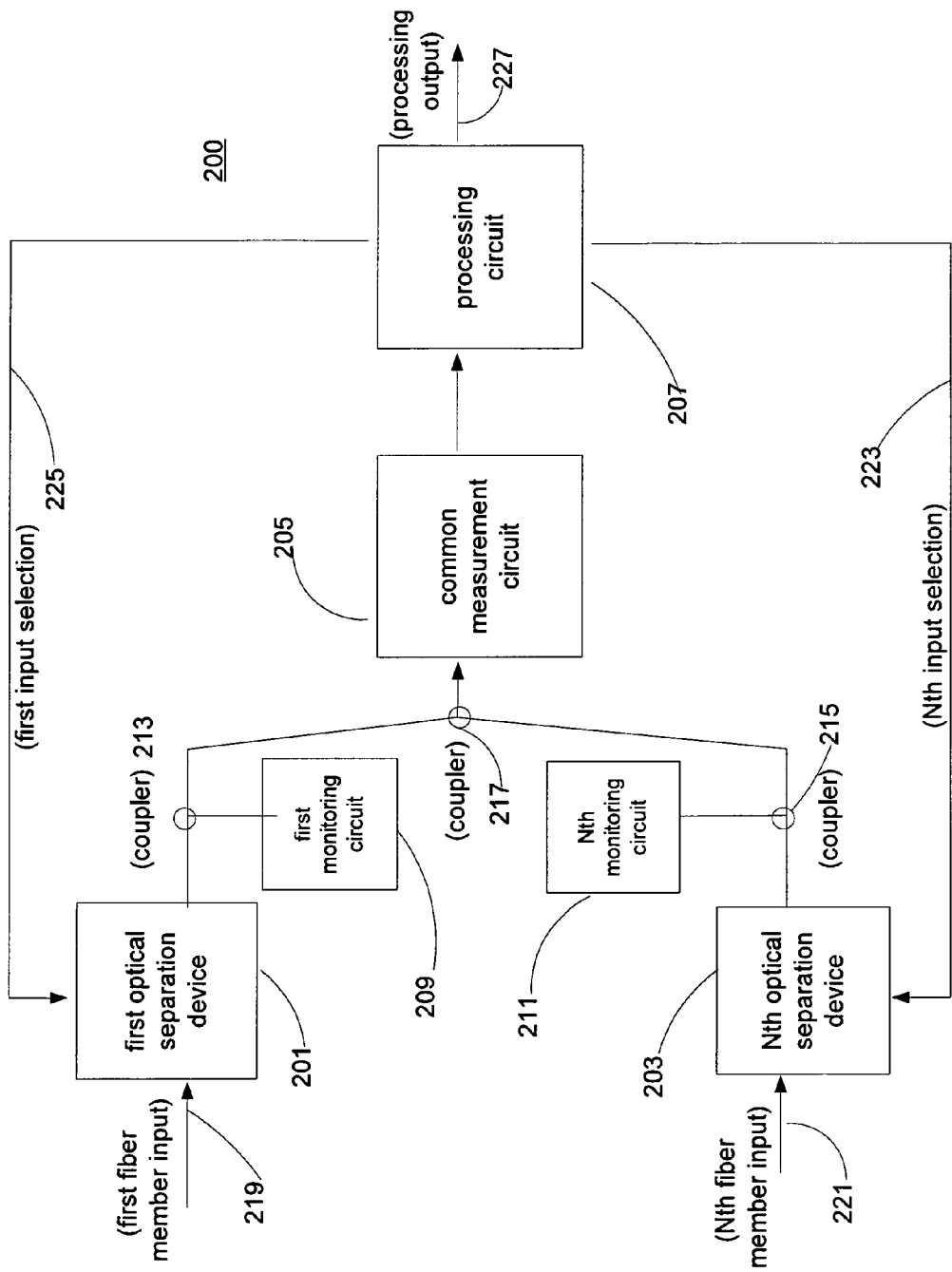
FIG. 2 shows an apparatus for measuring an optical parameter for one of the fiber members in accordance with at least one aspect of the preset disclosure.

FIG. 2 shows an apparatus 200 for measuring an optical parameter for one of the signal inputs 219 and 221 in accordance with at least one aspect of the present disclosure. Apparatus 200 supports measurements for signal input 219 corresponding to a first optical fiber member, signal input 221 corresponding to an Nth optical fiber member, and signal inputs corresponding to optical fiber members 2 to (N−1), which are not shown in FIG. 2. An optical fiber member may support one or more optical fiber signals. For example, a plurality of optical fiber signals may be multiplexed on a single optical fiber member using dense wavelength-division multiplexing. The selection of one of the signal inputs is selected by processing circuit 207 by selecting one of the optical separation devices 201 and 203. For each additional signal input supported, an additional optical separation device is configured in apparatus 200. The output of the selected optical separation device approximates the input to the selected optical separation device. If an optical separation device is not selected, the optical separation device is essentially "opened" so that the corresponding transmission impedance is sufficiently large thus not affecting the output of the selected optical separation device. As discussed above, each optical separation device 201 and 203 has one optical input and one optical output and is capable of adjusting the gain from the optical input to the optical output from approximately unity to approximately zero. Examples of an optical separation device include a 1:1 opto-mechanical switch and an electronic variable optical attenuator (EVOA). In accordance with at least one aspect of the disclosure, the extinction ratio of the EVOA is greater than 20 dB.

Processing circuit 207 may select one of the signal inputs 219 and 221 by activating the corresponding optical separation devices 201 and 203 through input selection ports 225 and 223, respectively. As shown in FIG. 2, the output of first optical separation device 201 is combined with the output of Nth optical separation device 203 by coupler 217. However, processing circuit 207 activates only one optical separation device at a given instance of time so that the combined output at coupler 217 corresponds only to the signal input of the selected optical separation device.

Common measurement circuit 205 determines a measured value of the selected signal input from the combined output at coupler 217. Common measurement circuit 103 measures the output of optical N:1 switch 101 to determine a measured value of an optical parameter. Common measurement circuit 205 may measure one of a number of optical parameters, including an optical spectrum tilt (often measured by an optical spectrum analyzer (OSA)), insertion loss, and a reflection coefficient (often measured by a reflectometer). Processing circuit 207 provides processing output 227, which is indicative of the measured value of an optical parameter. Processing circuit 207 may further obtain a plurality of measurements for the selected optical fiber member to obtain a statistical measurement (such as a measurement average) of the optical parameter for the selected optical fiber measurement. Processing circuit 207 may repeat the above process for the remaining optical fiber members.

In the embodiment shown in FIG. 2, each output of optical separation devices 201-203 are coupled to a corresponding monitoring circuits 209-211, respectively, through couplers 213-215, respectively. In accordance with at least one aspect of the disclosure, each monitoring circuit 209-211 comprises a light emitting diode. If the corresponding optical separation device were stuck opened, a user would not observe a light being emitted by the light emitting diode 209, 211. On the other hand, if the corresponding optical separation device were stuck closed, a user would observe a constant light emission rather than a flickering light emission that would result from the corresponding optical separation device being periodically selected by processing circuit 207.

Figure 3:
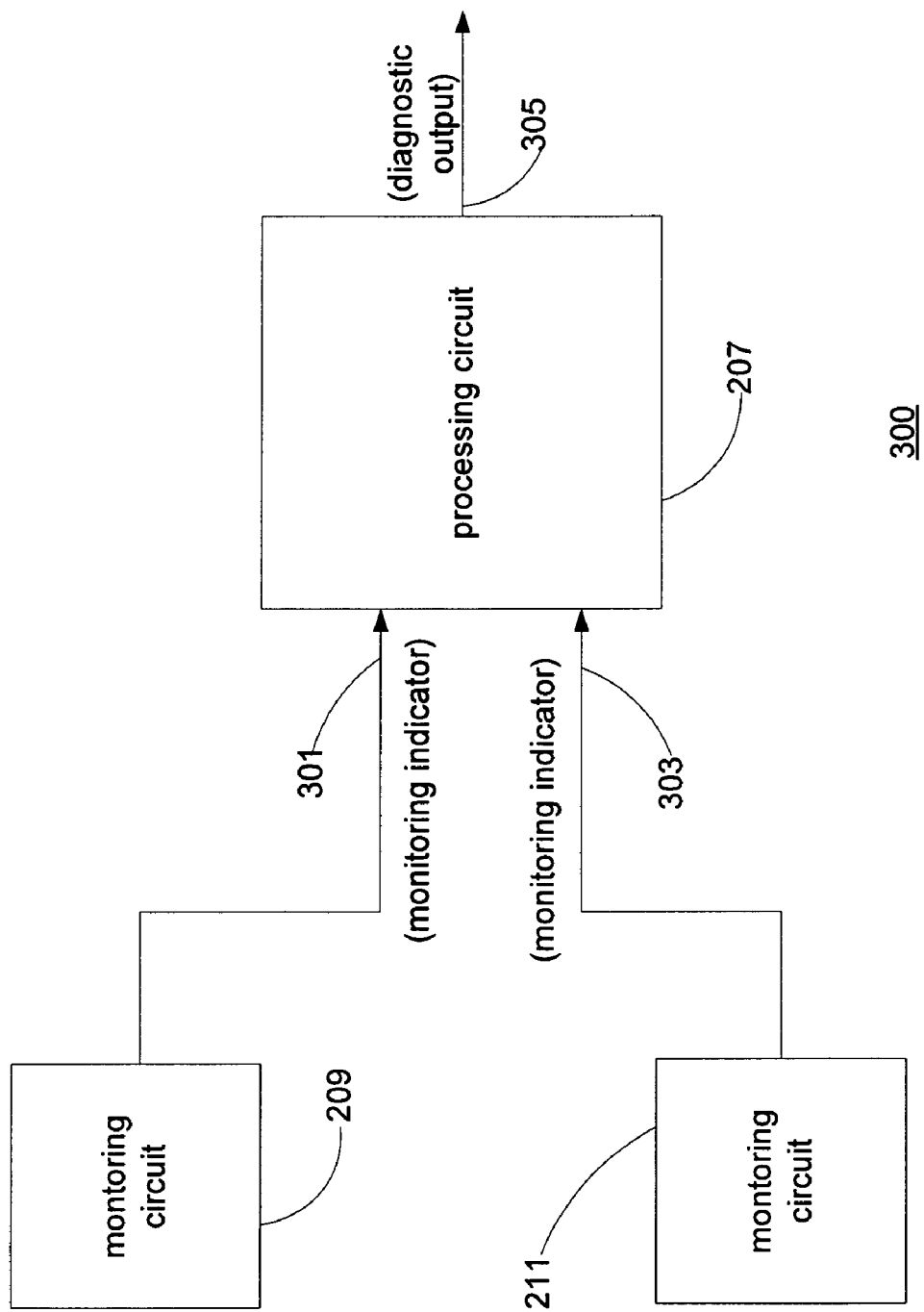
FIG. 3 shows the apparatus in which monitoring circuits are monitored by a processing circuit in accordance with at least one aspect of the preset disclosure.

FIG. 3 shows an apparatus 300 in which monitoring circuits 209 and 211, as shown in FIG. 2, are monitored by processing circuit 207. While monitoring circuits 209 and 211 may provide visual indications whether the corresponding optical separation device is functioning properly, monitoring circuits 209 and 211 provide monitoring indicators to processing circuit 207 through monitoring indicators 301 and 303, respectively. For example, monitoring indicator 301 and/or 303 has a voltage level that is sufficiently high if the corresponding optical separation device is operating properly. Otherwise, monitoring indicator 301 and/or 303 has a voltage level that is sufficiently low if the corresponding optical separation device is operating improperly. Processing circuit 207, which is functioning as a diagnostic processor, provides diagnostic output 305 to indicate the status of each optical separation device.

Figure 4:
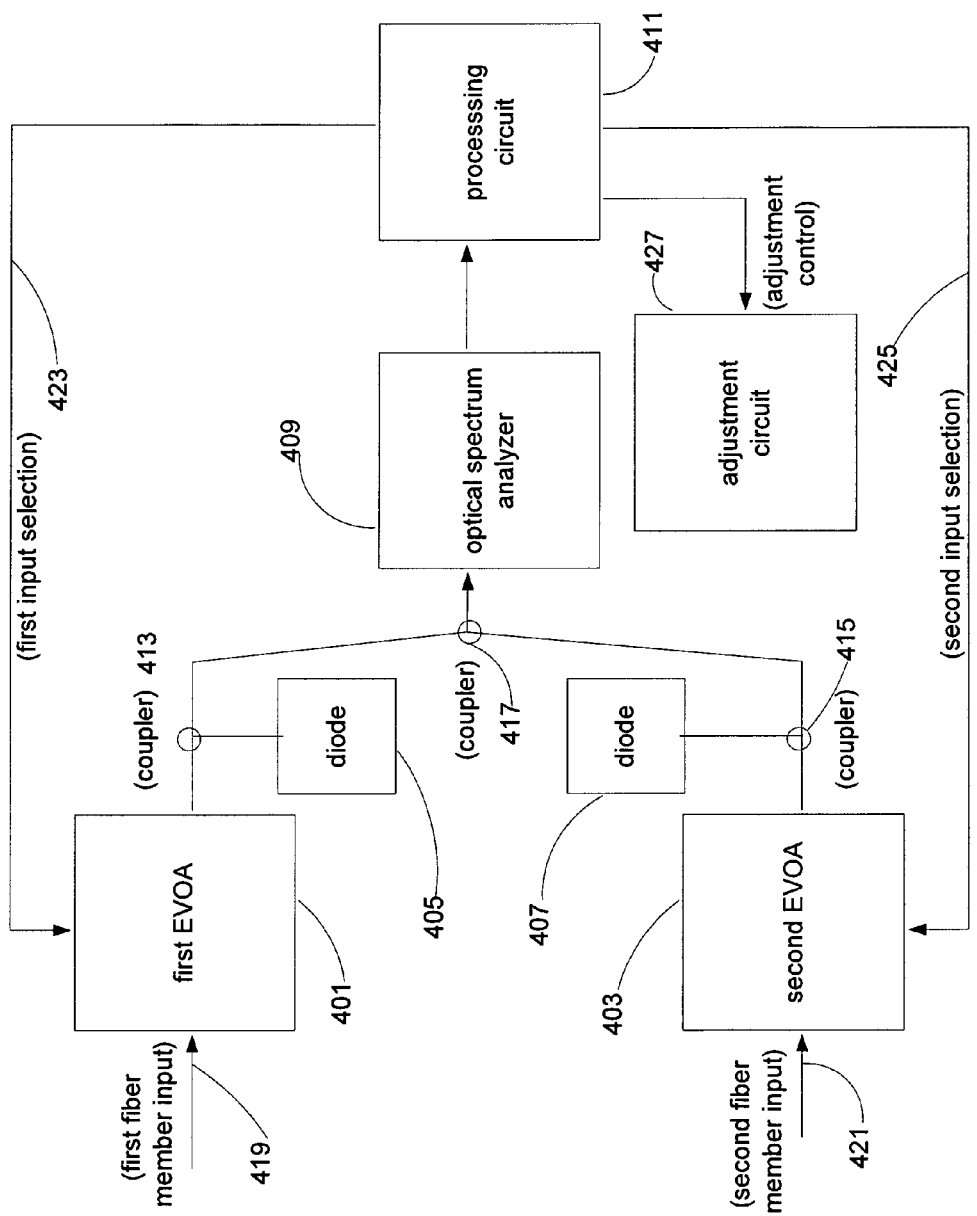
FIG. 4 shows an apparatus for measuring an optical parameter for a group of fiber members and for adjusting the adjustment parameters associated with the fiber members in accordance with at least one aspect of the preset disclosure.

FIG. 4 shows an apparatus 400 for measuring an optical parameter for a group of fiber members 419-421 and for adjusting the adjustment parameters associated with the fiber members in accordance with at least one aspect of the present disclosure. Each optical separation device 401 and 403 comprises an electronic variable optical attenuator (EVOA), although other embodiments of the disclosure may utilize other types of optical separation devices. Processing circuit 411 selects one of EVOA 401 or EVOA 403 through first input selection port 423 and second input selection port 425, respectively. The outputs of EVOA 401 and EVOA 403 are combined by coupler 417. Optical spectrum analyzer (OSA) 409 analyzes the selected signal input to determine a measured value of an optical parameter (e.g., reflection coefficient or spectrum tilt). Processing circuit 411 consequently obtains the measured value and determines that the corresponding optical fiber member requires an adjustment (through adjustment circuit 427) to cause the corresponding optical fiber member to have a desired measured value of the optical parameter. For example, the second optical fiber member, by analyzing signal input 421, may have a high reflection coefficient. Processing circuit 411 may instruct adjustment circuit 427 to configure a different termination impedance to reduce the reflection coefficient for the second optical fiber member to a desired value.

Apparatus 400 also monitors the operational status of EVOA 401 and EVOA 403 through coupler 413 and diode 405 and through coupler 415 and diode 407, respectively. If the status of one of the EVOA's indicates that the corresponding EVOA is functioning improperly, processing circuit 411 may defer the measurements for the corresponding signal input until the status changes because the measurements are suspect.

Figure 5:
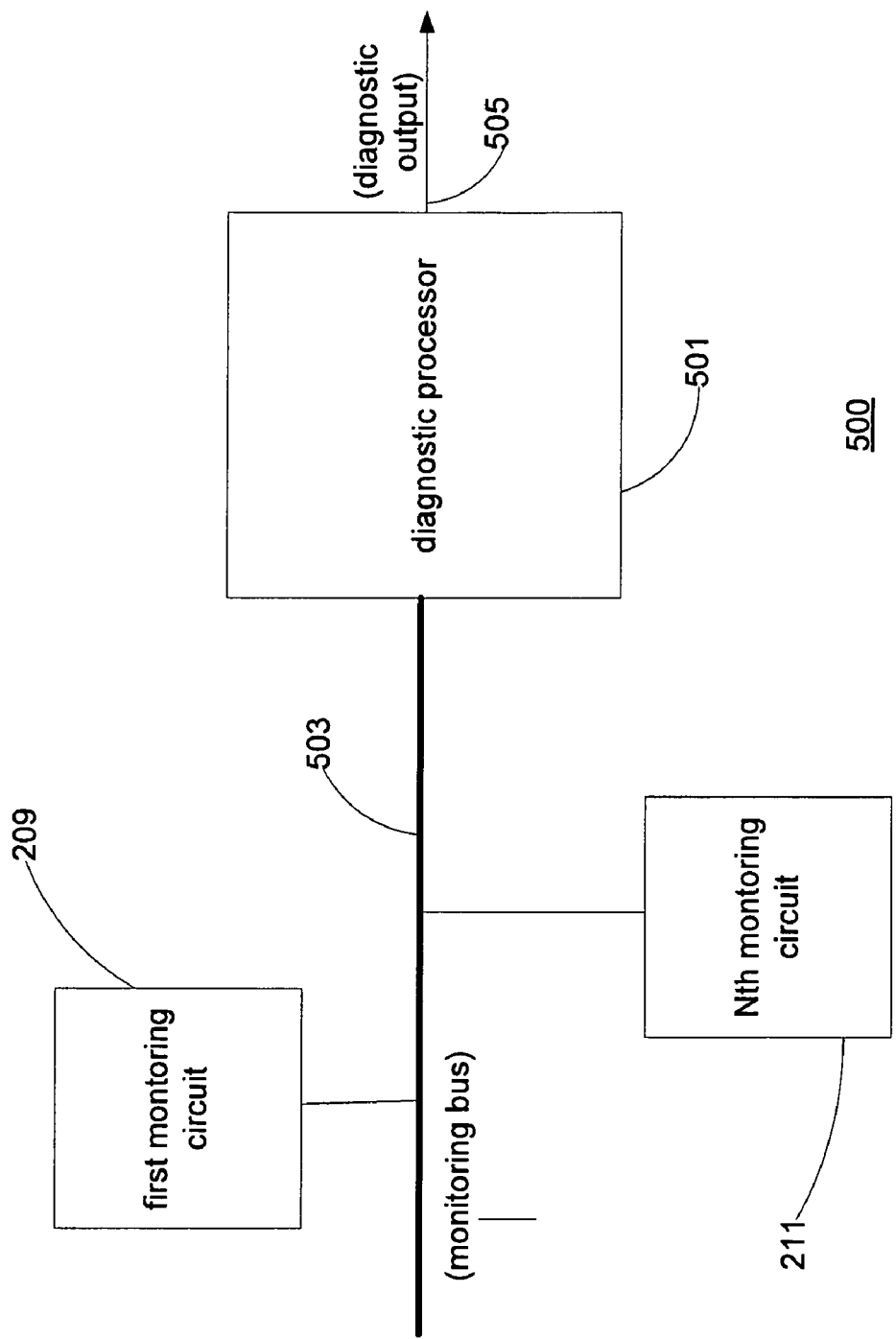
FIG. 5 shows apparatus for selecting a monitoring circuit in accordance with at least one aspect of the preset disclosure.

FIG. 5 shows an apparatus 500 for selecting a monitoring circuit in accordance with another aspect of the present disclosure. The embodiment that is shown in FIG. 3 uses separate status ports (i.e., monitoring indicators 301 and 303) for each monitoring circuit (i.e., monitoring circuits 209 and 211). However, in accordance with some aspects, the number of monitoring circuits may be very large, resulting in the number of status ports to being very large. In FIG. 5, diagnostic processor 501 addresses the selected monitoring circuit (i.e., monitoring circuits 209 and 211 as shown in FIG. 2) through monitoring bus 503. Diagnostic processor 501 provides an address (e.g., an octet to select one of 256 monitoring devices) to obtain the operational status of the corresponding monitoring device on monitoring bus 503. Diagnostic processor 501 (which may be functionally incorporated into processing circuit 207 as shown in FIG. 2 or into processing circuit 411 as shown in FIG. 4) provides diagnostic output 505 that may be used to generate a diagnostic report or some other indication to a user.

Figure 6:
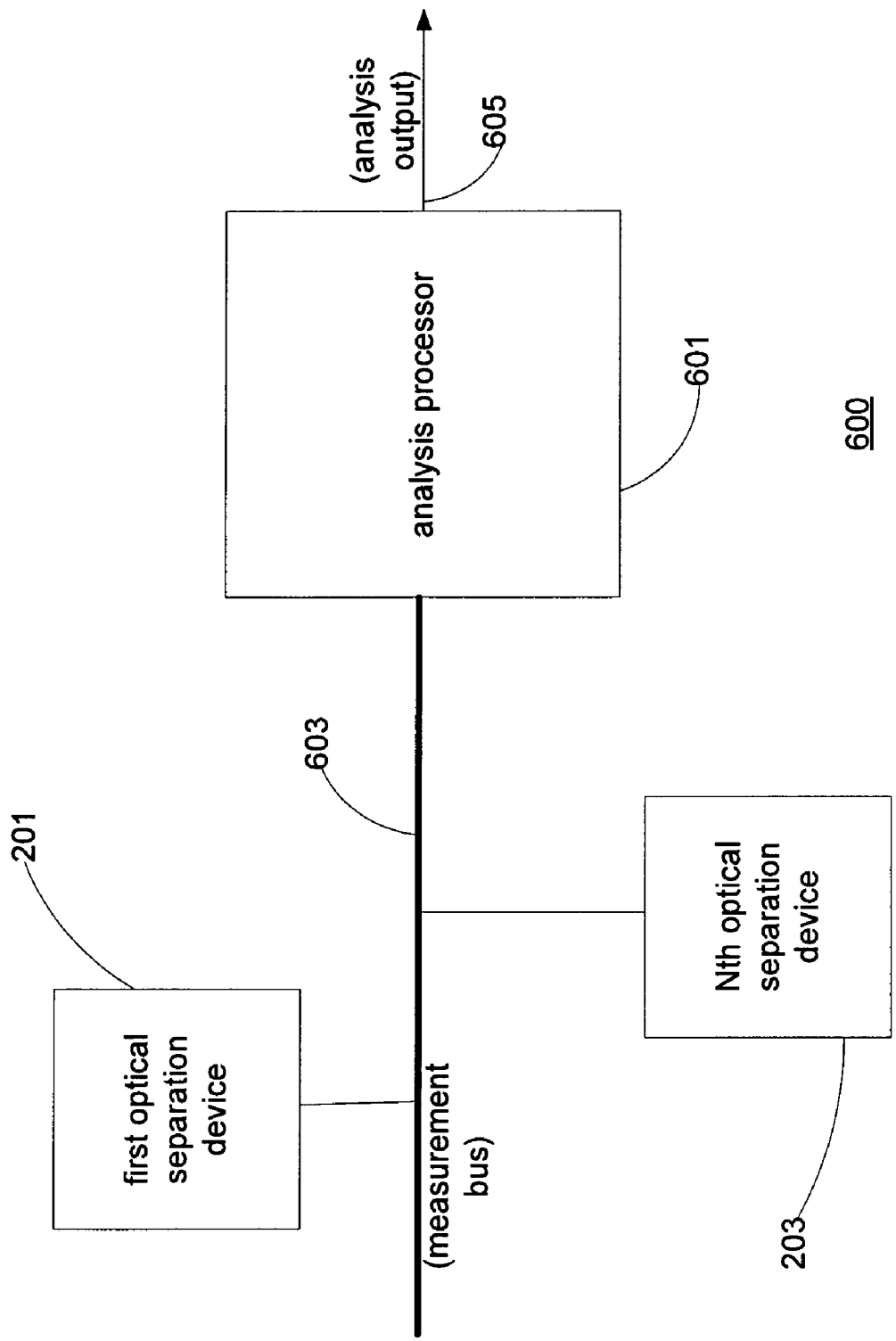
FIG. 6 shows apparatus for selecting an optical selection device in accordance with at least one aspect of the preset disclosure.

FIG. 6 shows an apparatus 600 for selecting optical selection device 201 or 203 in accordance with another aspect of the disclosure. Analysis processor 601 (which may be incorporated into processing circuit 207 as shown in FIG. 2 or processing circuit 411 as shown in FIG. 4) obtains an input signal through selected optical separation device 201 or 203 by providing an address on measurement bus 603. The selected optical selection device consequently provides a digital representation of the selected input signal on measurement bus 603. Analysis processor 601 processes the selected input signal to determine a measured value for an optical parameter and consequently to provide analysis output 605. For example, analysis output 605 may indicate a measured value of an optical parameter and/or may cause an optical fiber member to change a measured value of the optical parameter.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the disclosure has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   obtaining a plurality of optical fibers, each optical fiber having an associated optical separation device, each optical fiber having a plurality of signals;
   selecting a first optical fiber using a first optical separation device associated with the first optical fiber;
   providing an indicator that determines whether the first optical separation device is functioning properly;
   determining a first measured value of an optical parameter for the first optical fiber; and
   instructing an adjustment circuit that causes the first optical fiber to conform to a desired value of the optical parameter.

2. The method of claim 1, wherein selecting comprises:
   determining the first optical separation device; and
   activating the first optical separation device.

3. The method of claim 1, further comprising coupling a first monitoring circuit to a selected signal.

4. The method of claim 3, further comprising:
   coupling a second monitoring circuit to a second optical fiber signal; and
   determining whether a second optical separation device associated with a second optical fiber including the second optical fiber signal is functioning properly.

5. The method of claim 1, the optical parameter being selected from the group of: an insertion loss, a reflection coefficient, and a spectrum shape.

6. The method of claim 1, further comprising:
   selecting a second optical fiber by instructing a second optical separation device; and
   determining a second measured value of an optical parameter for the second optical fiber.

7. The method of claim 1, the first optical separation device comprising a 1:1 opto-mechanical switch.

8. The method of claim 1, the first optical separation device comprising an electronic variable optical attenuator (EVOA).

9. One or more computer readable media storing computer executable instructions that, when executed by at least one processor, cause the at least one processor to perform a method comprising:
   obtaining a plurality of optical fibers, each optical fiber having an associated optical separation device, each optical fiber having a plurality of signals;
   selecting a first optical fiber using a first optical separation device associated with the first optical fiber;
   providing an indicator that determines whether the first optical separation device is functioning properly;
   determining a first measured value of an optical parameter for the first optical fiber; and
   instructing an adjustment circuit that causes the first optical fiber to conform to a desired value of the optical parameter.

10. The one or more computer readable media of claim 9, wherein selecting comprises:
    determining the first optical separation device; and
    activating the first optical separation device.

11. The one or more computer readable media of claim 9, the method further comprising coupling a first monitoring circuit to a selected signal.

12. The one or more computer readable media of claim 11, the method further comprising:
    coupling a second monitoring circuit to a second optical fiber signal; and
    determining whether a second optical separation device associated with a second optical fiber including the second optical fiber signal is functioning properly.

13. The one or more computer readable media of claim 9, the optical parameter being selected from the group of: an insertion loss, a reflection coefficient, and a spectrum shape.

14. The one or more computer readable media of claim 9, the method further comprising:
    selecting a second optical fiber by instructing a second optical separation device; and
    determining a second measured value of an optical parameter for the second optical fiber.

15. The one or more computer readable media of claim 9, the first optical separation device comprising a 1:1 opto-mechanical switch.

16. The one or more computer readable media of claim 9, the first optical separation device comprising an electronic variable optical attenuator (EVOA).

17. A system comprising:
a first optical separation device configured to:
receive a first fiber member input from a plurality of signals from at least one optical fiber,
receive a first input selection signal from a processing circuit, and
output a first signal associated with the first fiber member input upon receipt of the first input selection signal;
an Nth optical fiber separation device configured to:
receive an Nth fiber member input from the plurality of signals from the at least one optical fiber,
receive an Nth input selection signal from the processing circuit, and
output an Nth signal associated with the Nth fiber member input upon receipt of the Nth input selection signal;
the processing circuit configured to:
output one of the first input selection signal and the Nth input selection signal, and
receive a measured value from a measurement circuit;
a first monitoring circuit configured to provide an indicator that determines whether the first optical separation device is functioning properly;
the measurement circuit configured to determine the measured value of an optical parameter for an inputted signal; and
an adjustment circuit that causes the inputted signal to conform to a desired value of the optical parameter.

18. The system of claim 17, further comprising an Nth monitoring circuit configured to provide an indicator that determines whether the Nth optical separation device is functioning properly.

* * * * *